Dec. 11, 1928.

L. S. SHIVELY 1,695,066

COIN TRIP MECHANISM FOR PERSONAL WEIGHING SCALES

Filed Sept. 10, 1925  5 Sheets-Sheet 1

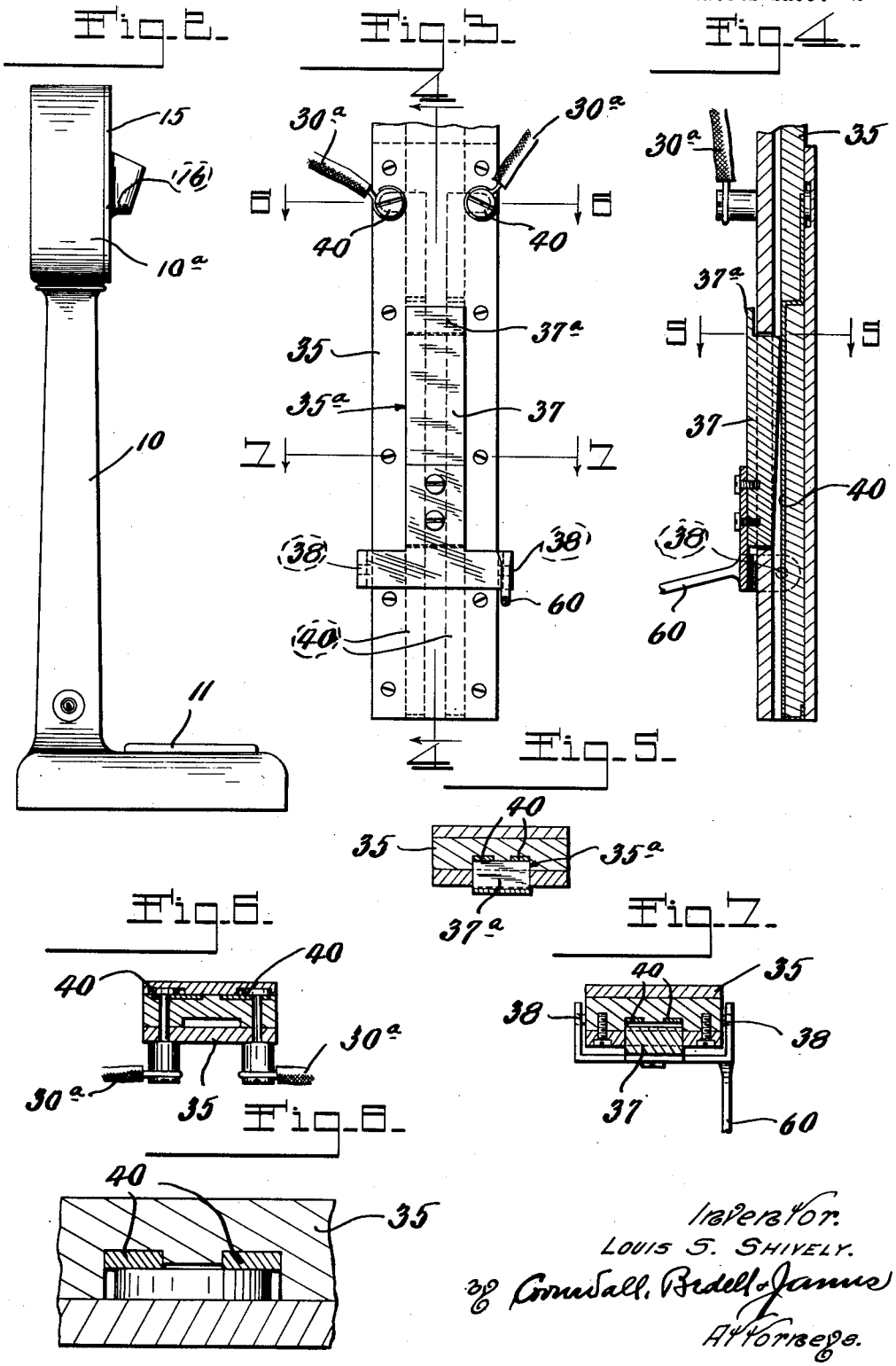

Dec. 11, 1928.
L. S. SHIVELY
1,695,066
COIN TRIP MECHANISM FOR PERSONAL WEIGHING SCALES
Filed Sept. 10, 1925   5 Sheets-Sheet 3
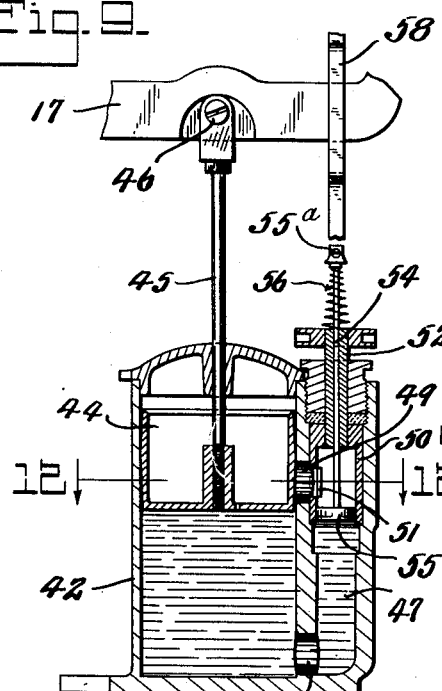
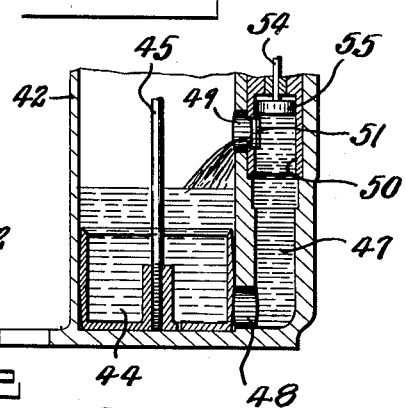
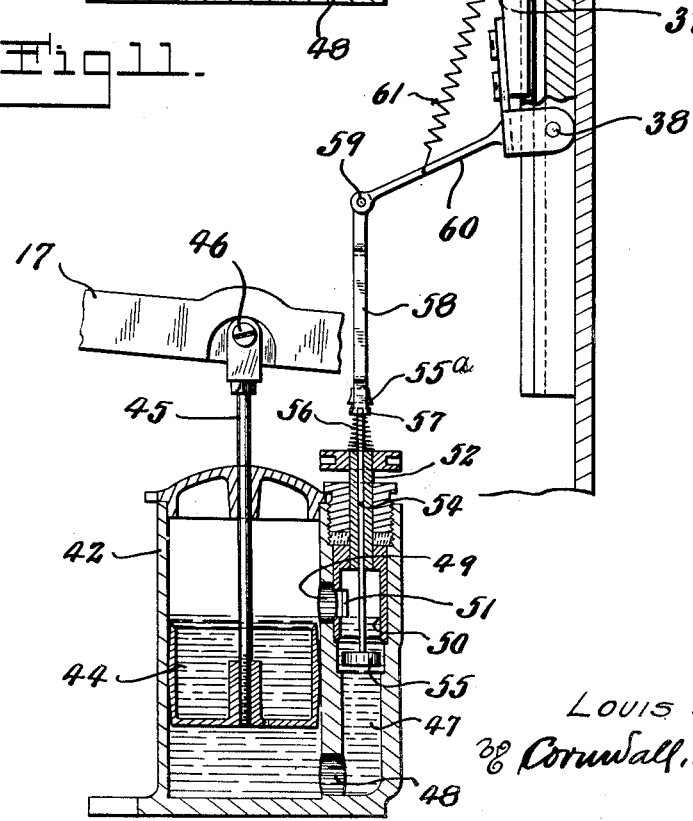
Inventor.
LOUIS S. SHIVELY.
Cornwall, Bedell & James
Attorneys.

Dec. 11, 1928.
L. S. SHIVELY
1,695,066
COIN TRIP MECHANISM FOR PERSONAL WEIGHING SCALES
Filed Sept. 10, 1925
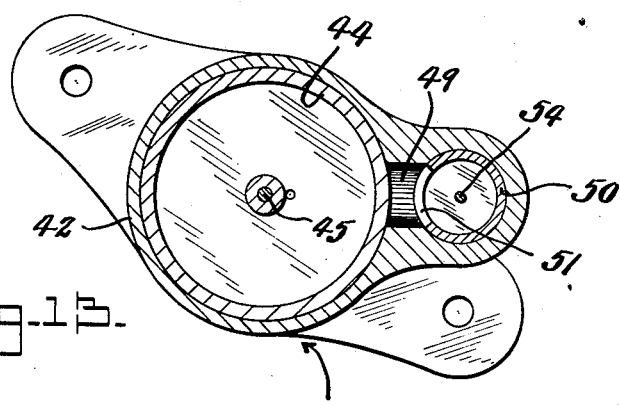
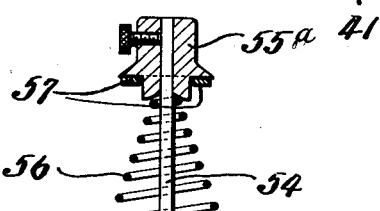
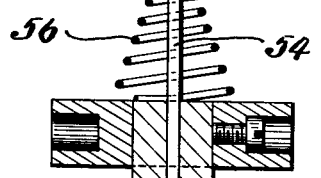
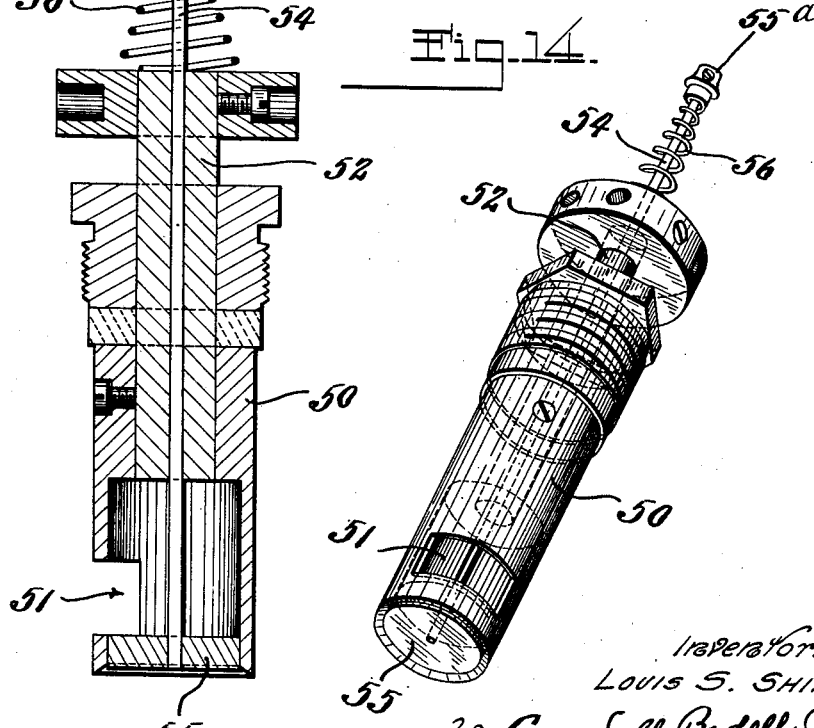
Inventor.
LOUIS S. SHIVELY.
Cornwall, Bedell & James
Attorneys.

Dec. 11, 1928.

L. S. SHIVELY 1,695,066

COIN TRIP MECHANISM FOR PERSONAL WEIGHING SCALES

Filed Sept. 10, 1925    5 Sheets-Sheet 5

Inventor:
Louis S. Shively.
By Cornwall, Birdell & Janus
Attorneys.

Patented Dec. 11, 1928.

1,695,066

UNITED STATES PATENT OFFICE.

LOUIS S. SHIVELY, OF ST. LOUIS, MISSOURI, ASSIGNOR TO THE WEIGHTOGRAPH COMPANY, OF ST. LOUIS, MISSOURI, A CORPORATION OF MISSOURI.

COIN-TRIP MECHANISM FOR PERSONAL WEIGHING SCALES.

Application filed September 10, 1925. Serial No. 55,591.

This invention relates generally to personal weighing scales, and more particularly to the type of scale disclosed in an application filed May 19, 1925, Serial Number 31,379, which eventuated in United States Letters Patent No. 1,631,341, granted June 7, 1927.

In personal weighing scales now commonly used, the operating mechanism of the scale is controlled by the insertion of a suitable coin in the scale. In the type of weighing scale to which this invention appertains, the weight indicia is arranged on a transparent member which is movable in accordance with the load on the weighing platform so as to select the proper weight indicia to indicate the correct weight, and this selected weight indicia is placed in the optical axis of projecting means which project the weight indicia in an enlarged form on a screen where it can be read by the person operating the scale. This projecting means includes a source of light, preferably an electric lamp, which has to be energized in order to enable the projection of the weight indicia on said screen.

The object of this invention is to arrange the circuit of said source of light so that the completion of said circuit and the energization of said source of light is accomplished by the insertion of a coin in a receiver or passage provided for that purpose, and to provide means operable in correlation with the operation of the scale mechanism for discharging said coin from its circuit-controlling position at a predetermined period after the weight indicia has been projected onto the screen, thereby disabling said projecting means and preventing the projection of the weight indicia until another coin has been inserted in the scale.

Another object of the invention is to provide means operable in correlation with the operation of a part of the scale mechanism for controlling a coin receiving mechanism, or any other mechanism as desired, in definite relation with the operating movement of the scale.

Another object of the invention is to provide a coin receiver, the passage through which is controlled by a moving part of the scale mechanism, whereby the coin is released and discharged from said receiver upon the removal of the load from the weighing platform of the scale.

An additional object of the invention is to provide means controlled by a moving part of the dashpot mechanism of the scale for temporarily retaining a coin deposited in said scale and utilizing said coin to complete the electric circuit of a source of light used in conjunction with said scale, whereby said source of light is energized during a predetermined period of the cycle of operation of said scale, and for releasing said coin and deenergizing said electric light during the subsequent operation of the scale.

With these and other objects in view, my invention consists in certain novel features of construction and arrangement of parts, hereinafter more fully described and claimed, and illustrated in the accompanying drawings, in which—

Fig. 2 is a side elevational view of a personal weighing scale.

Fig. 3 is a detail view of the coin chute.

Fig. 4 is a longitudinal cross section taken on line 4—4 of Figure 3.

Fig. 5 is a horizontal cross section taken on line 5—5 of Figure 4.

Fig. 6 is a horizontal cross section taken on line 6—6 of Figure 3.

Fig. 7 is a horizontal cross section taken on line 7—7 of Figure 3.

Fig. 8 is a horizontal cross section through a portion of the chute showing a coin positioned therein.

Fig. 9 is a vertical cross section through the dashpot mechanism showing the same in normal or inoperative position.

Fig. 10 is a fragmental view thereof showing its parts in moved position.

Fig. 11 is a vertical cross section through the dashpot mechanism showing the same connected to the means controlling the passage of a coin through the chute, and showing said means in actuated position.

Fig. 12 is a horizontal cross section taken on line 12—12 of Figure 9.

Fig. 13 is an enlarged detail view of the bypass valve.

Fig. 14 is an enlarged perspective detail view of the same.

Figure 1:
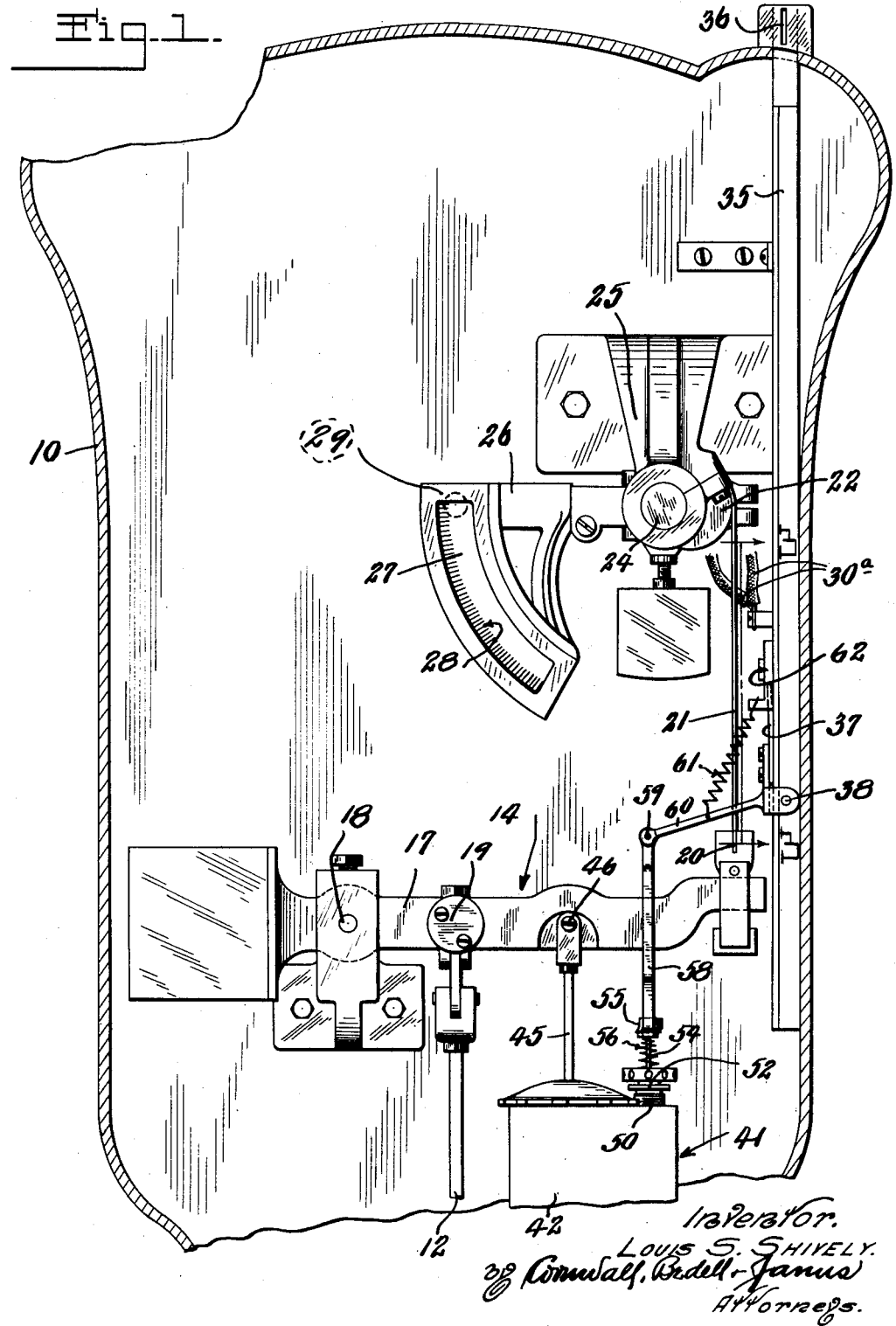
Fig. 1 is a vertical cross section through the upper portion of the housing of a personal weighing scale.
Figure 15:
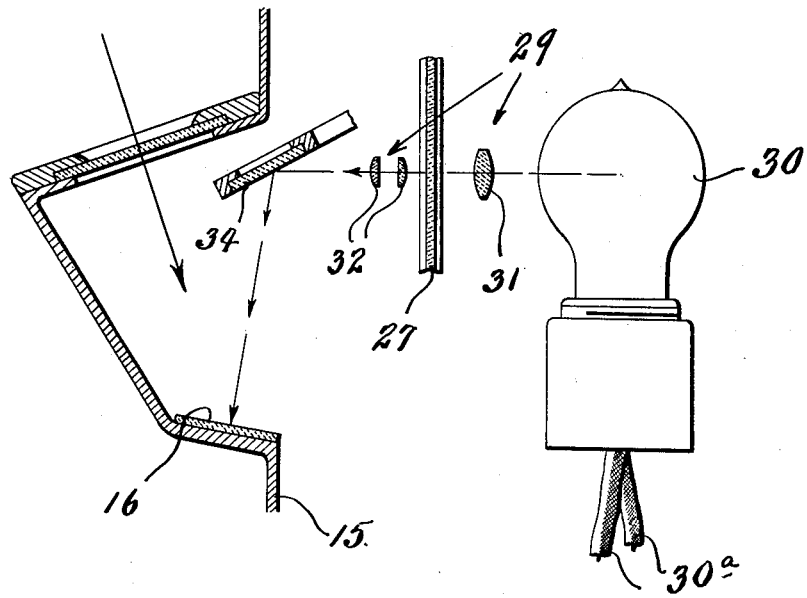
Fig. 15 is a diagrammatic view of the projecting means.
Figure 16:
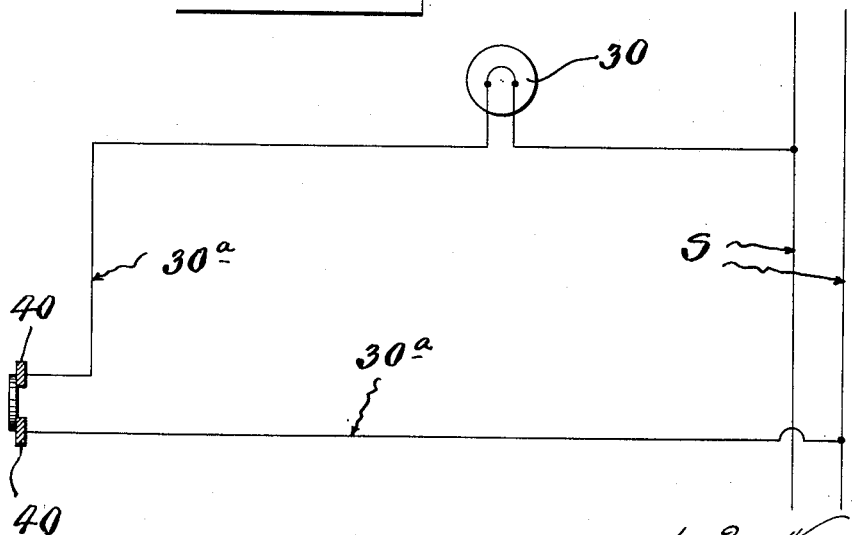
Fig. 16 is a diagrammatic view showing the electric circuit of the lamp and the coin engageable contacts thereof.

In the drawings, 10 indicates a scale provided with a weighing platform 11 connected by a rod 12 to a weighing mechanism 14 located in the housing 10ª of the scale 10. The front end of the housing 10ª is closed by removable cover plate 15 in which is arranged a screen 16 upon which the selected weight indicia is projected.

The weighing mechanism 14 consists of a lever 17 pivotally mounted at 18 and operable by said rod 12 pivotally connected thereto at 19. One end of the lever 17 has operative connection with the lower end 20 of a flexible connection 21 extending upwardly and operatively connected to an eccentric 22 carried by a shaft 24 journaled in bearings 25 mounted in said housing 10ª.

A member 26 is mounted on the shaft 24 in cooperative relation with the eccentric 22 and carries a transparent chart member 27 having arranged therein a series of weight indicia 28. This chart member is concentrically arranged with the shaft 24 and intersects the optical axis of projecting means 29 whereby, when said lever 17 is actuated by the rod 12, the chart member 27 is moved correspondingly and brings the proper weight indicia in line with the optical axis of said projecting means, whereby said weight indica can be projected onto screen 16.

This projecting means includes a source of light, preferably an electric lamp 30, and a condensing lens 31 supported within the housing 10ª between said chart and said lamp 30. Projecting lenses 32 are arranged on the opposite side of said chart and project the weight indicia against a reflecting member 34 which in turn reflects said weight indicia onto the screen 16. The weighing mechanism just described is more fully disclosed in United States Patents 1,402,970 and 1,357,731, and the projecting means is more fully described and illustrated in an application filed May 19, 1925, Serial Number 31,379, which eventuated in United States Letters Patent No. 1,631,341.

In the operation of the scale, the scale mechanism will be actuated when a person steps on the platform, but the projection of the weight indicia will not take place as long as the electric lamp 30 is not energized.

The electric circuit 30ª of the lamp 30 is not completed and said lamp not energized until a coin is deposited in the chute 35, the mouth 36 of which is arranged at a convenient point on the scale 10. When a coin is deposited in said chute, it drops into the lower end thereof where it is arrested in its movement by an arm 37 pivotally mounted on said chute at 38 and having its upper shouldered end 37ª projecting through a slot in said chute to form a stop for engaging the coin.

The electric circuit 30ª is connected to supply lines S and has interposed therein terminal pieces 40 consisting of two strips of metal arranged longitudinally in the lower end of said chute 35 and spaced from each other (Figures 5, 7 and 8). Normally, said circuit is open and the lamp 30 is inactive by virtue of the fact that said terminal pieces 40 are spaced and insulated from each other. When a coin is dropped in the chute it rests on the upper end 37ª of the arm 37 and comes in contact with both of said pieces 40, thereby completing the circuit and energizing the lamp 30, said circuit remaining closed and the lamp remaining energized as long as the coin is retained in contact with the pieces 40 of the arm 37. When the arm 37 is actuated and moved outwardly from said chute, (Figure 11) the coin is released and drops through the lower end of the chute into a receptacle in the scale 10, the circuit of the lamp being opened and the latter being de-energized.

In order to retain the coin in circuit-closing position for a period sufficient to enable the projection of the selected weight indicia onto the screen and to permit the release of the coin at a definite time during the operation of the scale, the arm 37 is operatively connected to a dashpot mechanism 41 which operates said arm in predetermined relation with the actuation of the scale.

This dashpot mechanism comprises a dashpot 42 arranged in the scale 10. The piston 44 of said dashpot is connected by a rod 45 to the lever 17 at 46. This dashpot is of the usual construction commonly employed in conjunction with scales to retard the operation of the scale mechanism and prevent sudden or violent movement thereof. The dashpot is filled with liquid. The piston 44 has an aperture in its bottom through which the liquid is allowed to pass at a predetermined rate in either direction when said piston is actuated.

The dashpot 42 is provided with a by-pass chamber 47 the lower end of which is connected with said dashpot by an opening 48 and the upper end of which is in communication with the dashpot 42 by an opening 49. A sleeve 50 is seated in the upper end of the chamber 47 and is provided with an opening 51 which registers with the opening 49. This sleeve 50 is adjustable to regulate the size of the opening formed by said registering ports 49 and 51, connecting the upper end of the by-pass 47 with the dashpot 42, to control the passage of liquid from the chamber 47 to the dashpot 42, and vice versa. In this manner, movement of the piston 44 in the dashpot 42 may be regulated as a portion of the liquid passes through the chamber 47.

A tubular member 52 is coaxially arranged in the sleeve 50 and operating in said member is a rod or valve stem 54, the lower end of which carries a valve or piston 55 operating in the sleeve 50. The upper end of stem 54 extends above the member 52 and terminates in an enlarged end 55ª. A small coil spring 56 is interposed between the enlarged end 55ª and the upper end of the member 52 and has a tendency to maintain said stem and valve 55 in normal position (Figure 9). Engaging the underside of the head 55ª is a bifurcated end 57 of a link 58, the upper end of which is pivotally connected at 59 to an extension 60 of the arm 37. A coiled spring 61 is connected at one end to the extension 60 and at the opposite end to a bracket 62 fixed to the chute 35 and adjustable thereon to regulate the tension of the spring 61. This spring has a tendency to maintain the arm 37 in closed position, as shown in Fig. 4. When said arm member is in closed position, said valve 55 and the stem 54 occupy positions shown in Fig. 9.

In the operation of the scale, when a person steps on the platform, the chart member 27 is actuated by the connections 12, the lever 17, and the flexible connection 21 to position the weight indicia, indicating the correct weight, in the optical axis of the projecting means 29. A coin inserted in the mouth 36 drops through the chute 35 and is stopped by the end 37ª of the arm 37, which end projects into said chute. The terminals or contacts 40 are arranged in said chute adjacent to said end 37ª and are exposed so that said coin will establish contact with both of said members, thereby completing the circuit 30ª of the lamp 30 and energizing the latter so as to affect projection of the weight indicia onto the screen 16.

This energization of the lamp 30 and the projection of the weight indicia is automatically controlled in a definite relation with the operation of the weighing mechanism 14 so as to disable said lamp and render the projecting means inoperative at a predetermined period of the cycle of operation of said scale. To accomplish this, the dashpot mechanism 41 is utilized to rock the arm 37 at the proper time so as to release the coin from contacting engagement with the members 40. As is well known, the dashpot 42, which is used to retard and check the operation of the scale mechanism, is operated every time a load is placed on the platform of the scale, the piston 44 of said dashpot being moved downwardly. During this downward movement of the piston, the valve 55 is caused to move upwardly due to the displaced liquid which is forced into the by-pass chamber 47. This causes the stem 54 to move upwardly but the arm 37 is not actuated as it already occupies the innermost position and the enlarged head 55ª of said stem 54, being arranged above the bifurcated end 57 of link 58, is free to move upwardly without affecting said link.

When a person steps off the platform, the lever 17 is actuated in the opposite direction and the piston 44 is moved upwardly. During this upward movement of said piston, the valve 55 is caused to move downwardly due to the difference of pressure produced in the opposite ends of the by-pass chamber 47. This movement of the valve 55 downwardly forces the enlarged head 55ª downwardly against the bifurcated end 57 of the link 58 which is also moved downwardly rocking the arm 37 so as to bring the end 37ª thereof away from the chute 35. This movement of the arm 37 releases the coin in said chute so that said coin is free to drop through the chute into a receptacle, not shown, located in the housing of the scale. As soon as said coin leaves the contact member 40, the circuit of the lamp is interrupted and the projecting means of the scale is disabled and will remain inoperative until another coin is inserted in said chute.

In this manner, the coin is utilized for effecting the completion of the electric circuit of the lamp. The retaining of the coin in engagement with the contacts or terminals of the circuit is controlled by means actuated in correlation with and upon predetermined operation of an operative part of the scale.

While I have shown and described the preferred form of my invention, it is obvious that the invention is susceptible of various changes and adaptations without departing from the spirit of my invention.

I claim:

1. In a personal weighing scale, the combination of weighing mechanism including a lever, indicating mechanism including illuminated projecting means, a coin chute having spaced electric terminals therein in circuit with the illuminating means, said circuit being adapted to be closed by a coin inserted in said chute, a detent operable in said chute to retain and release the coin from a position between said terminals, and a dash-pot mechanism operable through the movement of the lever whereby said detent is operated to retain the coin when load is placed upon the weighing mechanism and to release the coin when the load is removed from said weighing mechanism.

2. In a personal weighing scale, the combination of weighing mechanism including a lever, indicating mechanism including illuminated projecting means, a coin chute having spaced electric terminals therein in circuit with the illuminating means, said circuit being adapted to be closed by a coin inserted in said chute, a detent operable in said chute to retain and release the coin from a position between said terminals, a fluid pressure operated mechanism controlled by the movement of said lever, and a loose connection between said pressure operated mechanism and the detent whereby said detent is operated to release the coin after each reverse operation of the lever.

3. In a scale, weight indicating mechanism including an illuminating element, a circuit for said element, a coin chute, terminal elements in said coin chute adapted to be opened and closed by a coin inserted in said chute, weighing mechanism having a movable element, a detent in said chute for holding a coin between said terminal elements, and a fluid pressure operated mechanism controlled by said lever for operating said detent responsive to the direction of movement of said lever.

4. In a scale having weighing mechanism and indicating means, the combination of an electric circuit for controlling said indicating means, spaced terminals in said circuit, a chute for guiding an object between said terminals, a detent arranged to be interposed in said chute and to hold said object between said terminals, fluid pressure operated means between said detent and the weighing mechanism whereby when said weighing mechanism operates in one direction said detent will be positioned to hold said object to close said circuit and when moved in the opposite direction will release said detent and thereby release said object to open the circuit.

5. In a scale having weighing mechanism and indicating means, the combination of an electric circuit for controlling said indicating means, spaced terminals in said circuit, a chute for guiding an object between said terminals, a lever arranged to be moved into said chute and to hold said object between said terminals, an additional lever, connections for operating said additional lever by the thing being weighed, and devices operated by said second lever for positively moving said first lever when said weighing mechanism operates to a position to hold said object to close said circuit and to move said first lever in the opposite direction when the weighing mechanism returns to normal and thereby release said object to open the circuit.

6. In a scale, the combination of an electric circuit, spaced terminals in said circuit, a passage way for an object between said terminals, a lever arranged to engage said object, and fluid pressure operated means between said lever and the weighing mechanism of the scale operable in one direction to position said lever to hold said object and to close said circuit, and in the opposite direction to release said lever and thereby release said object.

7. In a scale, an electric circuit normally deenergized, a chute having spaced electric terminals therein, said circuit adapted to be closed by an object inserted in said chute, a member operable in said chute to retain and release the object from a position between the terminals, and a dash pot mechanism operable through the movement of the weighing mechanism of the scale whereby said lever is operated to retain the object when load is placed upon the weighing mechanism, and to release the object when the load is released from said weighing mechanism.

8. In a scale, the combination of weighing mechanism, indicating mechanism including illuminated projecting means, a chute having spaced electric terminals therein in circuit with the illuminating means, said circuit being adapted to be closed by an object inserted in said chute, a detent operable in said chute to retain and release the object from a position between the terminals, a dash pot having the piston thereof connected with the scale lever, and a fluid operated piston connected with said detent and co-ordinated with said dash pot for operating the same in correlation with the movement of the scale lever.

9. In a scale, the combination of weighing mechanism, indicating mechanism including illuminated projecting means, a chute having spaced electric terminals therein in circuit with the illuminating means, said circuit being adapted to be closed by an object inserted in said chute, a detent operable in said chute to retain and release the object from a position between the terminals, a dash pot having the piston thereof connected with the scale lever, and a fluid operated piston having loose connection with said detent and coordinated with said dash pot for operating the same in correlation with the movement of the scale lever.

In testimony whereof I hereunto affix my signature this 3rd day of September, 1925.

LOUIS S. SHIVELY.